United States Patent [19]
Deters

[11] 3,837,612
[45] Sept. 24, 1974

[54] MOLD APPARATUS FOR MIXED FLOW IMPELLER

[75] Inventor: Elmer M. Deters, Muscatine, Iowa

[73] Assignee: Red Jacket Manufacturing Company, Davenport, Iowa

[22] Filed: June 1, 1973

[21] Appl. No.: 366,074

[52] U.S. Cl. .................. 249/105, 249/142, 249/151
[51] Int. Cl. ............................................. B29c 1/06
[58] Field of Search ......... 249/105, 57, 59, 66, 142, 249/151, 160, 168, 169; 425/468, 249, 441, 438

[56] References Cited
UNITED STATES PATENTS

| | | | |
|---|---|---|---|
| 1,779,811 | 10/1930 | Harvey | 249/59 X |
| 1,925,400 | 9/1933 | Nelson | 249/160 |
| 2,524,858 | 10/1950 | Thomas | 425/249 |
| 2,975,481 | 3/1961 | Kauffman | 425/812 X |
| 3,189,671 | 6/1965 | Babb | 425/117 X |
| 3,537,676 | 11/1970 | Miller | 249/59 |
| 3,575,233 | 4/1971 | Mahle | 164/312 |

Primary Examiner—J. Spencer Overholser
Assistant Examiner—David B. Smith
Attorney, Agent, or Firm—Morsback, Pillote & Muir

[57] ABSTRACT

A mold apparatus for a mixed flow impeller having radially curved and axially pitched vanes at the front side of a conical impeller body. The mold apparatus has a rear mold section for shaping the rear side of the impeller and two interfitting front mold sections for forming the conical front face and the radially curved and axially pitched vanes on the front face. The two front mold sections are axially movable relative to the rear section and relative to each other and interfit along parting lines located angularly intermediate adjacent vane forming cavities and such that one of the front mold sections has a plurality of rigidly interconnected segments which define the trail wall of the several vane forming cavities and the other front mold section has a corresponding number of rigidly interconnected segments which define the lead wall of the several vane forming cavities.

10 Claims, 13 Drawing Figures

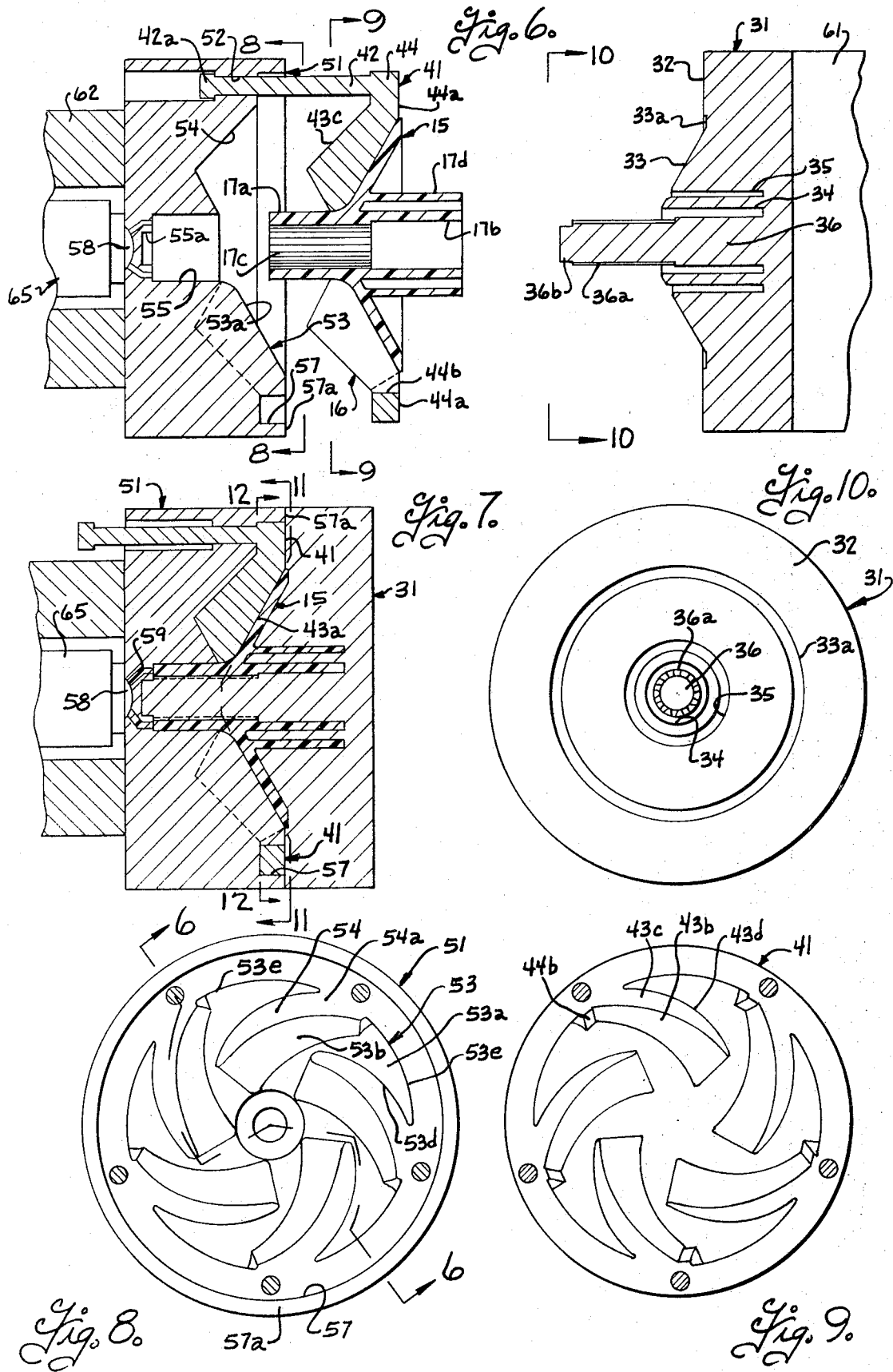

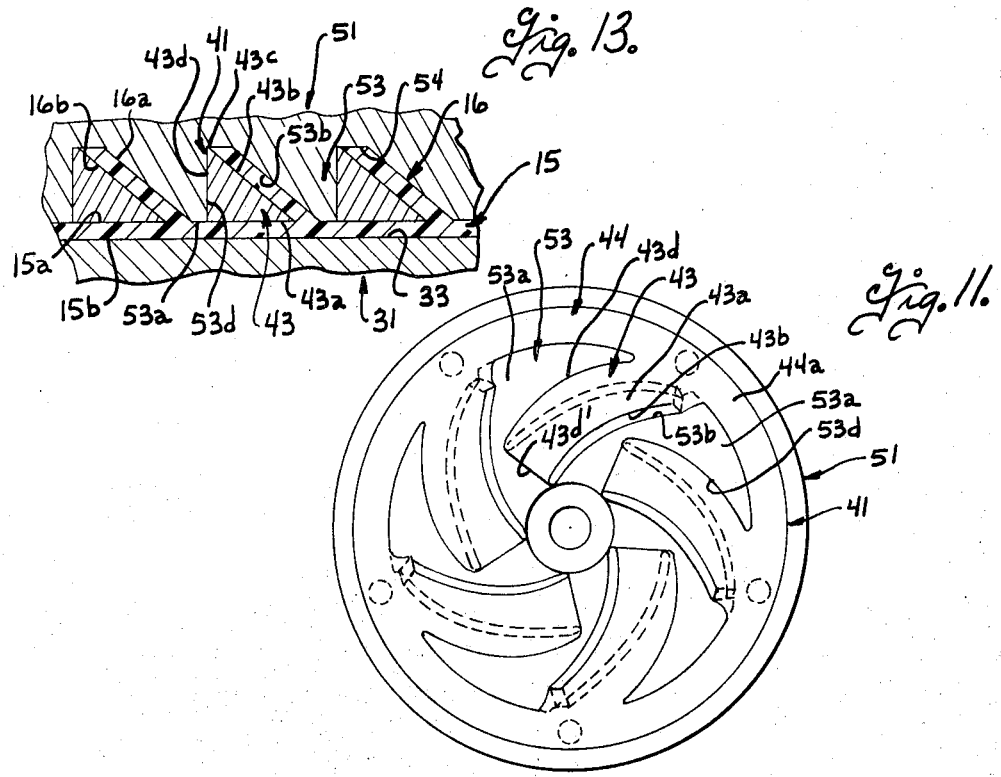
Fig. 13.
Fig. 11.
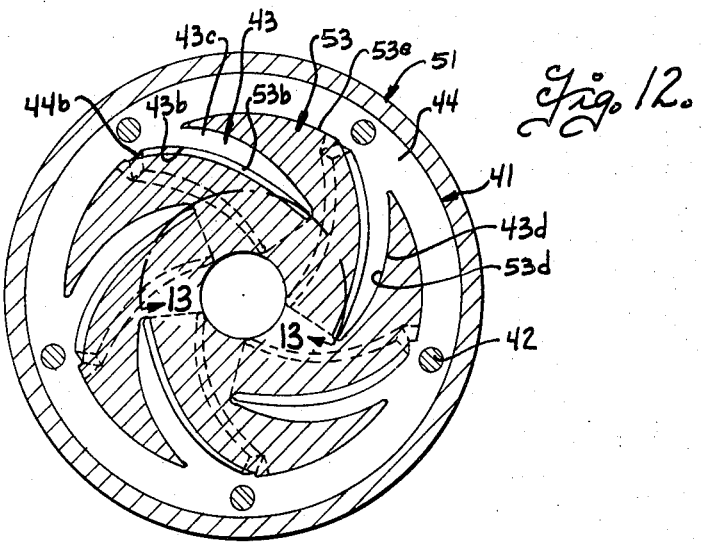
Fig. 12.

MOLD APPARATUS FOR MIXED FLOW IMPELLER

BACKGROUND OF THE INVENTION

In some pump applications, it is desirable to utilize a so-called mixed flow impeller which combines the axial flow produced by a propeller type pump with the centrifugal flow produced by a centrifugal type pump. Such mixed flow impellers generally have an impeller body with a generally conical front face and impeller vanes which are both radially curved and axially pitched to spiral outwardly along the conical face. Generally, the curvature of the outwardly spiraling vanes decreases in a direction from the inner to the outer ends of the vanes and, moreover, the axial pitch of the vanes frequently decreases in a direction from the inner to the outer ends of the vanes. The combined radial curvature and axial pitch of the vanes is such that the impellers cannot be molded with conventional molding apparatus. Instead, it is the usual practice to cast such mixed flow impellers utilizing destructible cores. The cost of casting such mixed flow impellers using destructible cores is relatively high.

SUMMARY OF THE INVENTION

The present invention relates to a mold apparatus for molding a mixed flow impeller having radially curved and axially pitched impeller vanes. The mold apparatus has a rear mold section for shaping the rear side of the impeller body and two front mold sections which cooperate with the rear mold section and with each other to define a mold cavity for forming an impeller body with a conical front face and integral impeller vanes which are radially curved and axially pitched. The two front mold sections are movable axially relative to the rear section and relative to each other to enable separation of the molded impeller from the mold apparatus.

The two front mold sections interfit to define a generally conical face for shaping the front side of the impeller body and a plurality of radially curved and axially pitched impeller forming cavities that communicate with the generally conical face at angularly spaced locations. One of the front mold sections has a plurality of angularly spaced segments which are rigidly interconnected for movement as a unit and which have one lateral surface longitudinally curved and axially pitched at an acute angle to a plane perpendicular to the impeller axis to form the lead wall of the vane forming cavity, and the other of the front mold sections has a corresponding number of segments rigidly interconnected for movement as a unit and having one lateral surface disposed at an obtuse angle to a plane normal to the impeller axis, to form the trail wall of the vane forming cavities. The first and second mold sections are separable along parting lines that are located angularly intermediate the adjacent vane forming cavities and shaped to enable axial separation of the second mold section from the first mold section and from the trail side of the vanes of the molded impeller so that the impeller can thereafter be separated from the first mold section by a combined rotary and axial movement.

Since the rear and the two front mold sections can be separated from each other and from the molded impeller by relative axial movement, the mold apparatus can be utilized on conventional molding machinery, for example injection molding machinery.

An important object of this invention is to provide an improved mold apparatus for molding mixed flow impellers having radially curved and axially pitched impeller vanes.

Another object of this invention is to provide a mold apparatus for molding mixed flow impellers having radially curved and axially pitched vanes which requires only three relatively movable mold sections.

A more particular object of this invention is to provide a mold apparatus for molding mixed flow impellers in which the mold apparatus includes a rear mold section for shaping the rear side of the impeller and two front mold sections which are movable axially relative to the rear mold section and relative to each other between an interfitting relation to define an impeller mold cavity and an axially separated position to allow removal of the impeller from the mold apparatus.

These, together with other features and advantages of this invention will be more readily understood by reference to the following detailed description when taken in connection with the accompanying drawings wherein:

FIG. 6 is a longitudinal sectional view through a mold apparatus taken on the broken line section 6—6 of FIG. 8 for forming the impeller showing the mold sections axially separated;

FIG. 7 is a longitudinal sectional view through the mold apparatus showing the mold apparatus in a closed condition for molding the impeller body;

FIG. 8 is a sectional view through the open mold apparatus taken on the plane 8—8 of FIG. 6;

FIG. 9 is a sectional view through the open mold apparatus taken on the plane 9—9 of FIG. 6;

FIG. 10 is a sectional view through the open mold apparatus taken on the plane 10—10 of FIG. 6;

FIG. 11 is a transverse sectional view through the closed mold apparatus, taken on the plane 11—11 of FIG. 7, and with the rear mold section removed;

FIG. 12 is a transverse sectional view through the closed mold apparatus taken on the broken line section of 12—12 of FIG. 7; and FIG. 13 is a fragmentary sectional view taken on the curved section line 13—13 of FIG. 12.

Figure 1:
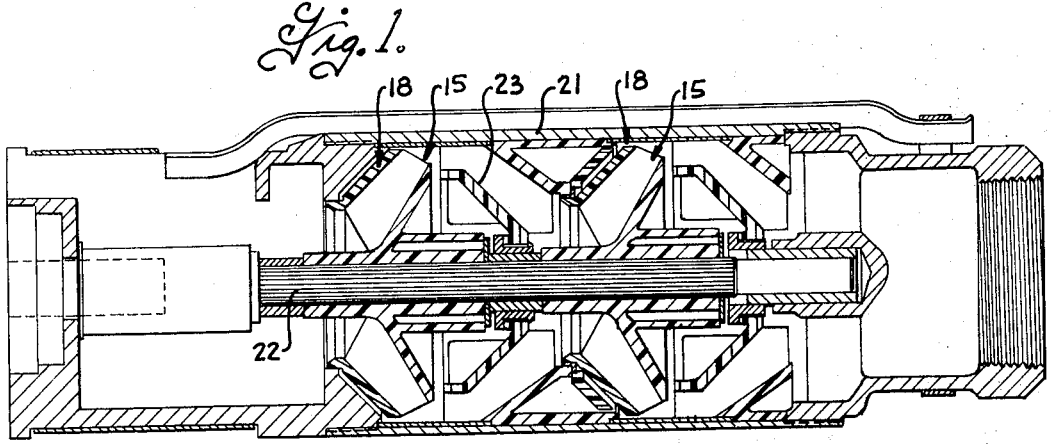
FIG. 1 is a longitudinal sectional view through a pump apparatus employing mixed flow impellers.
Figure 2:
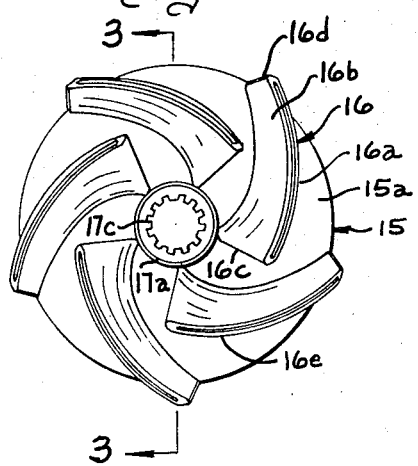
FIG. 2 is a plan view of an open face mixed flow impeller.
Figure 3:
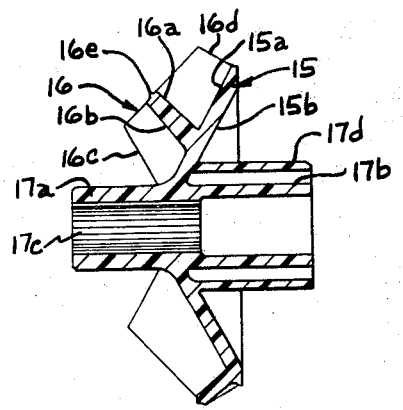
FIG. 3 is a sectional view through the open face impeller taken on the plane 3—3 of FIG. 2.

The present invention relates to a mold apparatus for molding mixed flow pump impellers of the type shown in FIGS. 2 and 3 and which in general include an annular impeller body 15 having a generally conical front wall 15a and a rear wall 15b also of preferably generally conical shape to reduce the volume of material and hence the cost of the impeller body. It is not essential that the front and rear walls of the body 15 be in the form of a true cone in which the radial slope of the front and rear walls is constant as illustrated in the drawings, and the front and rear walls can be formed with a varying radial curvature if desired. The term conical, as used herein, is intended to cover generally cone shaped impellers of uniform outward slope as well as varying outward slope. The impellers have a plurality of impeller vanes integrally formed with the impeller body 15, herein shown six in number and designated 16. The impeller vanes spiral outwardly from adjacent the center of the impeller to a point adjacent their outer periphery and the impeller vanes are pitched axially relative to a plane perpendicular to the impeller shaft to produce a combined axial and centrifugal flow. Preferably, the impeller vanes curve outwardly in a generally logarithmic spiral, and the axial pitch of the vanes is preferably a maximum adjacent the inner end of the vanes and decreases in a direction toward the radially outer end. Thus, the lead faces 16a of the vanes are pitched at an acute angle to the plane normal to the axis of the impeller and the trail faces 16b of the vanes extend at an obtuse angle to a plane perpendicular to the impeller axis. For reasons pointed out hereinafter, the impeller vanes 16 are angularly spaced apart around the impeller in a manner such that the axial projection of one impeller vane on the conical front face 15a of the impeller body does not overlap the next adjacent impeller vane. As shown in FIGS. 2 and 3, the inner edges 16c of the impeller vanes diverge from the front face 15a in a direction axially of the impeller and, preferably, the outer edges 16d also diverge from the impeller body 15a in a direction axially of the impeller.

The impeller body preferably has a hub formed integrally therewith and, as best shown in FIG. 3, the hub includes a portion 17a that projects forwardly from the front face of the impeller body and a portion 17b that projects rearwardly from the rear side of the impeller body. The hub portion 17a is preferably internally splined as indicated at 17c and this can be achieved in the mold apparatus by either directly molding the internal splines in the hub or by molding or otherwise inserting an internally splined insert into the hub 17a. In the embodiment illustrated, an annular shroud 17d is advantageously molded on the rear side of the impeller body around the hub portion 17b.

Figure 4:
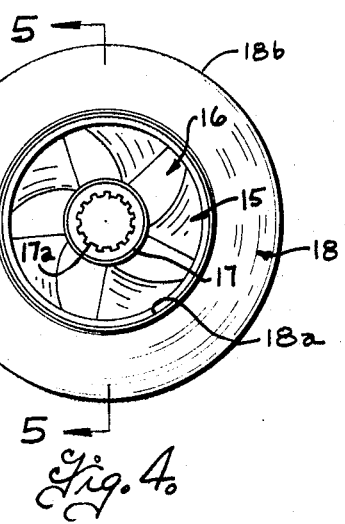
FIG. 4 is an end view of a mixed flow impeller having a face shroud applied thereto to provide a closed face type impeller.
Figure 5:
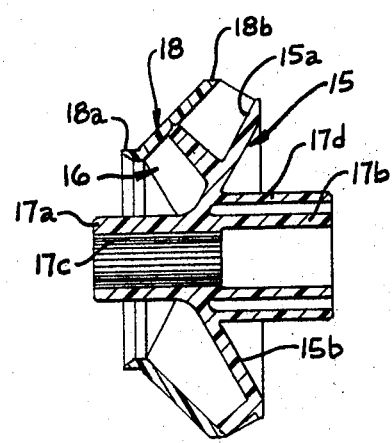
FIG. 5 is a sectional view through the closed face type impeller taken on the plane 5—5 of FIG. 4.

The impellers can be used as open face type impellers in the form shown in FIGS. 2 and 3 by mounting the impellers in a pump in such a manner that the forward edges of the impeller vanes extend closely adjacent the stationary pump casing. Somewhat greater efficiency is achieved by utilizing a generally conical shroud 18 which is attached as by adhesive bonding or the like to the front faces of the impeller vanes to provide a closed face type impeller, as shown in FIGS. 4 and 5. As is conventional, the shrouds such as 18 on the closed face type impellers have an annular intake opening 18a that surrounds the hub at the inner ends of the impeller vanes, and the shroud terminates at its outer edge 18b adjacent the outer periphery of the impeller vanes. In order to improve the seal between the edges of the vanes and the shroud, the vanes are conveniently molded with a thin rib or ridge 16e along their forward edge, as best shown in FIGS. 2 and 3. When utilized in a pump, the impellers 15 are mounted in a pump casing 21 and drivingly connected to a drive shaft 22. In a multistage pump, the pump includes diffuser cases 23 that define passages which communicate at one end with the outer periphery of the impellers of one stage and at the other end with the inner intake opening of the impeller of a next succeeding stage.

The apparatus for molding the mixed flow impeller is shown in FIGS. 6–13 and includes a rear mold section 31 shaped to form the rear side of the impeller body and first and second front mold sections 41 and 51 adapted to interfit and shaped to form the front side of the impeller body and the impeller vanes. The mold sections are mounted for movement relative to each other in a direction axially of the mold cavity and, as diagrammatically shown in FIG. 6, one of the mold sections such as the rear section 31 is mounted on a platen 61 of a molding machine (not shown) and another of the mold sections such as the front mold section 51 is mounted on a second platen 62 of the molding machine, the platens being mounted for movement toward and away from each other in a direction axially of the mold sections to open and close the mold sections in a manner well understood in the art and forming no part of the present invention. Mold section 41 is mounted for movement relative to the section 51 and, as shown, has guide rods 42 which are slidably received in guide bores 52 on the mold section 51. Any suitable means (not shown) may be provided for moving the mold sections 41 and 51 axially relative to each other.

The rear mold section 31 has an annular face 32 which cooperates with a corresponding face on the front mold section 41, to form a mold cavity therewith. Mold body 31 has a generally conical portion 33 inwardly of the annular face 32 and shaped to form the rear side of the impeller body, and a shallow annular recess 33a at the juncture of the cone-shaped surface 33 and the mold sealing surface 32. Mold section 31 also has a annular recess 34 shaped to form the rearwardly extending hub portion 17b on the inpeller and an outer annular recess 35 shaped to form the annular shroud 17d on the impeller. The shaft receiving bore in the hub is advantageously formed by a plug member 36 rigid with the mold section 31 and having a splined end portion 36a that projects forwardly from the cone face 33 to form the internally splined portion 17c of the impeller hub.

The mold sections 41 and 51 are arranged to interfit as shown in FIGS. 7 and 11–13 to define a generally conical face shaped to form the front side of the impeller body mold cavity and a plurality of radially curved and axially pitched vane forming cavities that intersect the generally conical face. Mold section 41 comprises a plurality of angularly spaced segments 43 which are rigidly interconnected by an annular ring member 44 for movement as a unit. The segments 43 extend inwardly from the annular ring member 44 at angularly spaced locations, as best shown in FIGS. 9, 11 and 12. Mold section 51 comprises a rigid mold body having a corresponding number of segments 53 which are adapted to interfit with the segments 43. More particularly, the ring member 44 has an end face 44a cooperable with the face 32 on the mold section 31 to form a peripheral closure for the mold cavity. The segments 43 and 53 have end faces 43a and 53a respectively (FIG. 11) arranged to form a generally conical end face when the mold sections 41 and 51 are interfitted to form the front side of the impeller body mold cavity. The mold sections 41 and 51, when interfitted, also form the lead and trail walls of the impeller vane forming mold cavity which are radially curved and axially pitched relative to the axis of the mold cavity. More particularly, the segments 43a of the mold section 41 have one lateral surface 43b that intersects the end face 43a and it is longitudinally curved and axially pitched relative thereto at an acute angle to a plane perpendicular to the axis of the conical face, to define the lead wall of a vane forming cavity. As previously discussed in connection with the description of the mixed flow impeller vanes, the radial curvature and the axial pitch of the lateral surface 43b is preferably arranged so that the lead face of the impeller vanes spiral outwardly with a decreasing curvature, and the axial pitch of the vanes also preferably decreases in a direction outwardly of the mold cavity. In addition, the axial depth of the lateral surface 43b preferably is a maximum adjacent its inner end and decreases progressively toward its radially outer end. The segments 53 have one lateral surface 53b that is longitudinally curved and axially pitched at an obtuse angle to a plane perpendicular to the axis of the conical end face 53a to define the trail wall of a vane forming cavity. Thus, the lateral walls 43b and 53b of the segments 43 and 53 are spaced apart as shown in FIGS. 11 and 12 when the front mold sections are interfitted to form the lead and trail walls of vane forming cavities that intersect the end faces 43a and 53a of the segments.

Mold section 51 has angularly spaced surfaces 54 offset axially from the end face surfaces 53a of the segments 53 a distance corresponding to the axial depth of the vanes, which surfaces preferably form segments of a conical surface as shown in FIG. 6 to define the forward edge of the impeller vanes. The surfaces 54 can have a shallow groove formed therein to provide the aforedescribed thin rib 16e on the forward ends of the vanes. The segments 43 on the mold section 41 have end faces 43c shaped to engage the faces 54 on the mold section 51, when the sections 41 and 51 are interfitted. Thus, the end faces 43c on the segments 43 also form angularly spaced portions of a conical surface, as best shown in FIG. 6.

As also previously described, the outer ends 16d of the impeller vanes preferably diverge outwardly in a direction away from the impeller body 15. For reasons which will become apparent hereinafter, the annular member 44 of the mold section 41 is provided with wall portions 44b that extend generally circumferentially of the impeller body between the lead and trail walls 43b and 53b of the vane forming cavities, and which portions diverge outwardly from the end face surfaces 43a of the segments 43.

The segments 43 and 53 of the mold sections 41 and 51 respectively interfit and are separable along a parting line which extends angularly intermediate adjacent ones of the vane forming cavities and which is so shaped as to allow axial separation of the front mold section 41 from the other front mold section 51. More particularly, the angularly spaced segments 43 of the mold section 41 have a second lateral surface 43d which is disposed at an angle of 90° or greater to a plane perpendicular to the axis of the conical impeller cavity, and the angularly spaced segments 53 of mold section 51 have a second lateral surface 53d formed complementary to a respective one of the surfaces 43d. The lateral face 43d of the segments 43 intersects the end face 43a of the segments and extends from the radially inner end of the lateral surface 43b outwardly along a locus or line which is located angularly intermediate adjacent ones of the impeller forming cavities, as best shown in FIG. 11. The lateral surface 43d is preferably generated by a line parallel to the axis of the impeller cavity and moving from a point adjacent where the lateral surface 43b intersects the end face 43a along a line segment designated 43d' corresponding generally to the axial projection of the inner end of the vane forming cavity and then outwardly along a line segment 43d" which is angularly intermediate adjacent ones of the vane forming cavities. The lateral wall surfaces 53d on segments 53 are formed complementary to the surfaces 43d. The surface 43d is preferably formed parallel to the axis of the impeller cavity as previously described to minimize the angular spacing required between adjacent vanes on the impeller. However, the surface 43d can be shaped to extend from the end face 43a at an angle slightly greater than 90° with respect to a plane perpendicular to the axis of the conical face 43a while yet allowing axial separation of the mold section 41 from the mold section 51. Similarly, the circumferential parting line defined by the inner wall 44b of the ring member 44 and the complementary peripheral wall surfaces 53e on the segments 53 are preferably arranged perpendicular to the axis of the conical face. However, if desired, the inner face 44b of the ring member 44 can be inclined at an angle of slightly greater than 90° with respect to the end face 44a and the surfaces 53e on segments 53 inclined complementary thereto, and yet allow free axial separation of the mold section 41 from the mold section 51. Mold section 51 is preferably formed with an annular rim 57 that surrounds the ring member 44 on mold section 41 when the mold sections are closed to align the mold sections, and rim 57 has an end face 57a arranged to sealingly engage the face 32 on the rear mold section 31.

Mold section 51 is also formed with an annular cavity 55 that extends from the generally conical faces 53a of segments 53 to form the forwardly extending portion 17a of the impeller hub. As best shown in FIGS. 6 and 7, a centering boss 55a is conveniently provided at the inner end of the recess to receive a corresponding projection 36b on the plug member 36 to center the same.

From the foregoing it is thought that the construction and use of the mold apparatus to form mixed flow impellers will be readily understood. As previously described, the rear mold section 31 and the front mold section 51 can be mounted on platens indicated at 61 and 62 respectively of a molding machine for movement relative to each other in a direction axially of the mold cavity, and front mold section 41 is conveniently supported as by rods 42 on the mold section 51 for movement relative thereto in a direction axially of the mold cavity. Mold section 41 can be moved to its open position through a distance at least sufficient to clear the impeller vanes from the mold cavity 51 by any suitable means (not shown) such as springs, or a positive actuator, and stops such as 42a are conveniently provided on the rods 42 to limit opening movement of the mold section 41.

The rear mold section 31 and the forward mold sections 41 and 51 are operative, when closed as shown in FIG. 7, to define an impeller mold cavity having front and rear generally conical walls to shape the impeller body and radially curved and axially pitched vane forming cavities that intersect the conical cavity of the impeller body. The impellers can be formed of any suitable material such as an injection moldable plastic material. the impeller forming material such as plastic material is injected under pressure into the mold cavity and, as diagrammatically shown in FIGS. 6 and 7, an injection mechanism 65 is arranged to communicate through a dispersion well 58 and sprue openings 59 in one of the mold sections, such as mold section 51, with the mold cavity to supply material thereto, suitable vent openings being provided at appropriate locations in the mold apparatus to allow venting of gases during the molding operation. After the mold cavity has been filled and the plastic material allowed to cool sufficient to form a relatively rigid body, the rear mold section 31 is moved axially away from the front sections 41 and 51 and the front section 41 is thereafter moved axially away from the front section 51 as shown in FIG. 6. The molded impeller moves with the front mold section 41 away from the other front section 51, and the impeller body can thereafter be separated from the mold section 41 by a combined axial and rotary movement. As will be seen, movement of the segments 53 of the mold section 51 away from the molded impeller and from the mold section 41 provides an angular clearance space between the molded impeller vanes and the segments 43 of the mold section 41 to allow relative angular movement therebetween to disengage the impeller vanes from the mold segments 43.

The embodiments of the invention in which an exclusive property or privilege is claimed are defined as follows:

1. A mold apparatus for molding a mixed flow impeller including an annular impeller body have a rear side and a generally conical front side and integral radially curved and axially pitched impeller vanes extending forwardly from the front side of the impeller, the mold apparatus including a rear mold means shaped to form the rear side of an impeller body mold cavity and front mold means including first and second interfitting front mold sections movable axially relative to each other and to the rear mold means, said first and second front mold sections when interfitted defining a generally conical face shaped to form the front side of the impeller body mold cavity and a plurality of radially curved and axially pitched vane forming cavities intersecting said generally conical face, and each having lead and trail walls, said first mold section including a first set of angularly spaced segments rigidly interconnected for movement as a unit and each having one lateral surface intersecting the conical face and longitudinally curved and axially pitched relative thereto at an acute angle to a plane perpendicular to the axis of the conical face to define the lead wall of a vane forming cavity, each segment of the first set having a second lateral surface disposed at an angle of no less than 90° to a plane perpendicular to the axis of the conical face and intersecting said conical face along a line which extends from the inner end of said one lateral surface of the respective segment outwardly along a locus angularly intermediate adjacent ones of said impeller forming cavities, said second mold section including a second set of angularly spaced segments rigidly interconnected for movement as a unit and each having one lateral surface longitudinally curved and axially pitched at an obtuse angle to a plane perpendicular to the axis of the conical face to define the trail wall of a vane forming cavity and a second lateral surface complementary to the second lateral surface on the first set of segments to interfit therewith whereby said second mold section is movable axially away from said first mold section out of engagement with the trail side of the vanes of an impeller mold in the cavity and the molded impeller can then be separated from the first mold section by relative rotary and axial movement.

2. A mold apparatus according to claim 1 wherein said second lateral surface of each segment of each of the first and second sets is defined by a generating line which parallels the axis of the conical face.

3. A mold apparatus according to claim 1 wherein said second mold section has an annular recess coaxial with said generally conical face surface to form a hub on the front side of the impeller body.

4. A mold apparatus according to claim 1 wherein said second mold section has an annular recess coaxial with said generally conical face surface to form a hub on the front side of the impeller body and said rear mold section has a plug adapted to project into the annular recess in the second mold section to form a shaft receiving opening in the hub.

5. A mold apparatus according to claim 4 wherein said plug is externally splined to form an internally splined shaft opening in the hub.

6. A mold apparatus according to claim 1 wherein said first set of segments of said first mold section are rigidly interconnected at their radially outer ends by an annular member.

7. A mold apparatus according to claim 1 wherein said first set of segments of said first mold section are rigidly interconnected at their radially outer ends by an annular member, said annular member having circumferentially spaced portions extending crosswise of the lead and trail walls of the vane forming cavities and inclined outwardly relative to the periphery of said generally conical face surface to form outwardly diverging ends on the impeller vanes.

8. A mold apparatus according to claim 1 wherein the curvature of said one lateral surface on the first set of segments and the curvature of said one lateral surface on said second set of segments progressively decreases in a direction from the inner to the outer end thereof.

9. A mold apparatus according to claim 1 wherein the axial pitch of said one lateral surface on the first set of segments and the axial pitch of said one lateral surface on the second set of segments progressively decreases in a direction from the inner to the outer end thereof.

10. A mold apparatus according to claim 1 wherein the curvature of said one lateral surface on the first set of segments and the curvature of said one lateral surface on said second set of segments progressively decreases in a direction from the inner to the outer end thereof, and the axial pitch of said one lateral surface on the first set of segments and the axial pitch of said one lateral surface on the second set of segments progressively decreases in a direction from the inner to the outer end thereof.

* * * * *